United States Patent
Harrison et al.

(10) Patent No.: US 12,522,341 B2
(45) Date of Patent: Jan. 13, 2026

(54) APPARATUS AND METHODS FOR TRANSONIC TRUSS-BRACED WING AIRCRAFT

(71) Applicant: The Boeing Company, Arlington, VA (US)

(72) Inventors: Neal A. Harrison, Snohomish, WA (US); Paul W. Dees, Snohomish, WA (US); Donald Thomas Powell, Everett, WA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/482,600

(22) Filed: Oct. 6, 2023

(65) Prior Publication Data

US 2025/0115346 A1   Apr. 10, 2025

(51) Int. Cl.
    *B64C 1/26*    (2006.01)
    *B64C 3/14*    (2006.01)
    *B64D 27/40*   (2024.01)
    *B64F 5/10*    (2017.01)

(52) U.S. Cl.
    CPC ............. *B64C 1/26* (2013.01); *B64C 3/14* (2013.01); *B64D 27/40* (2024.01); *B64F 5/10* (2017.01); *B64C 2003/149* (2013.01)

(58) Field of Classification Search
    CPC ........ B64D 27/02; B64D 27/06; B64D 27/12; B64D 27/18; B64D 27/40; B64D 27/402; B64C 3/26; B64C 3/32; B64C 2003/149
    See application file for complete search history.

(56) References Cited

U.S. PATENT DOCUMENTS

| | | | |
|---|---|---|---|
| 2,398,704 A | | 4/1946 | Gassner |
| 5,899,409 A | * | 5/1999 | Frediani ............... B64C 39/068 244/45 R |
| 2011/0180660 A1 | * | 7/2011 | Llamas Sandin ..... B64C 39/068 244/45 R |
| 2013/0020433 A1 | * | 1/2013 | Hoisington ............ B64D 27/12 244/62 |
| 2013/0264428 A1 | * | 10/2013 | Rouyre ................... B64C 39/02 244/45 R |
| 2019/0300143 A1 | * | 10/2019 | Harrison .................... B64C 3/14 |
| 2019/0300160 A1 | * | 10/2019 | Moxon ..................... B64C 3/16 |
| 2020/0247525 A1 | * | 8/2020 | Manterola Ottonello .................... B64C 25/32 |
| 2022/0297825 A1 | * | 9/2022 | Simonneaux ........... B64C 25/10 |

OTHER PUBLICATIONS

European Patent Office, "Extended European Search Report," issued in connection with European Patent Application No. 24202155.8, dated Jan. 29, 2025, 6 pages.

\* cited by examiner

*Primary Examiner* — Joshua J Michener
*Assistant Examiner* — Michael B. Kreiner
(74) *Attorney, Agent, or Firm* — Hanley, Flight & Zimmerman, LLC

(57) ABSTRACT

Apparatus and methods for transonic truss-braced wing aircraft are disclosed herein. An example aircraft disclosed herein includes a fuselage and a wing supported by a truss. The truss includes a pylon coupled to and extending from the fuselage and a strut attached to the wing. An engine is coupled to the pylon.

21 Claims, 11 Drawing Sheets

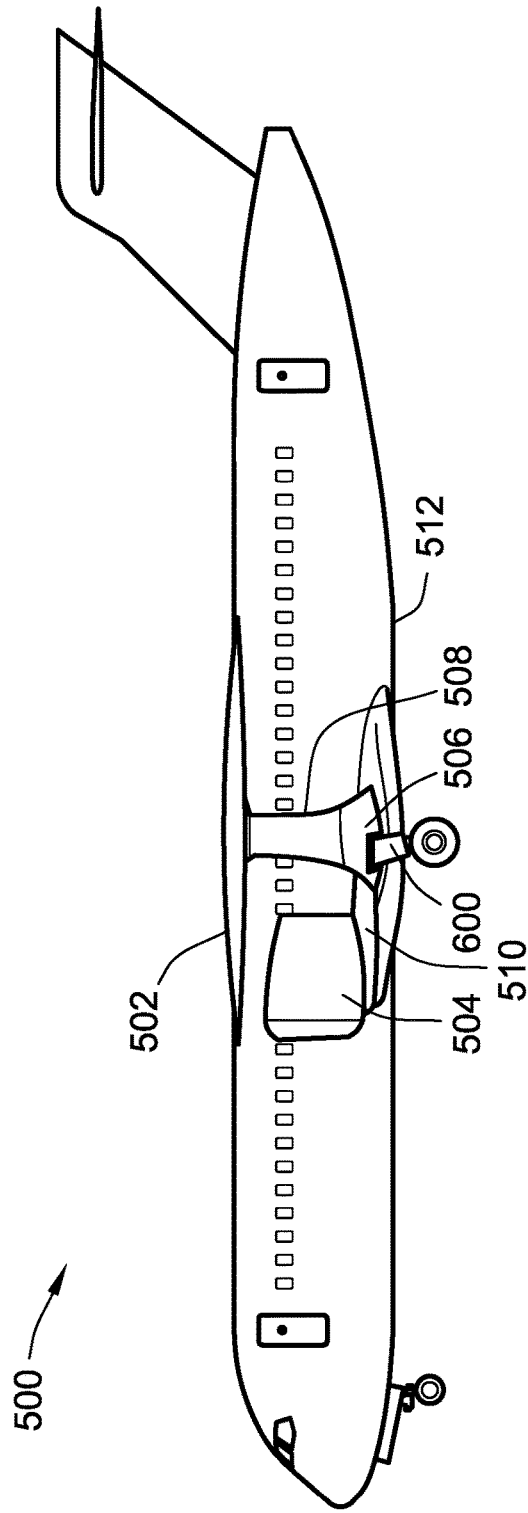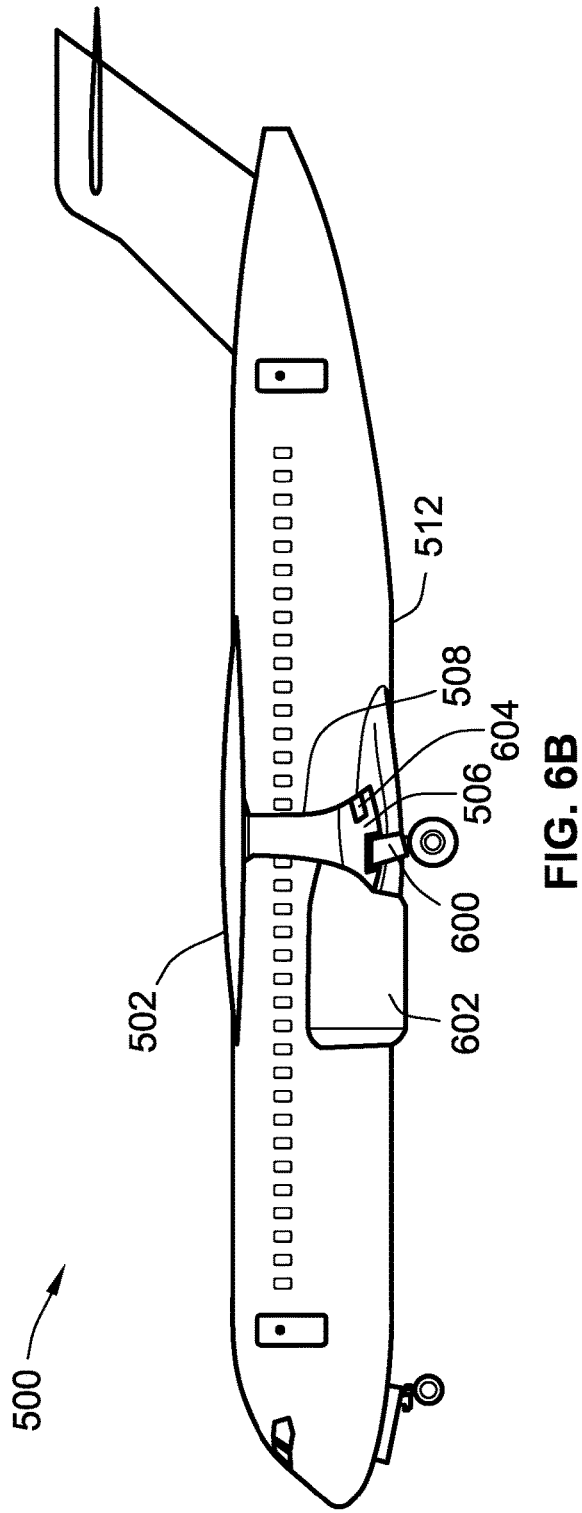

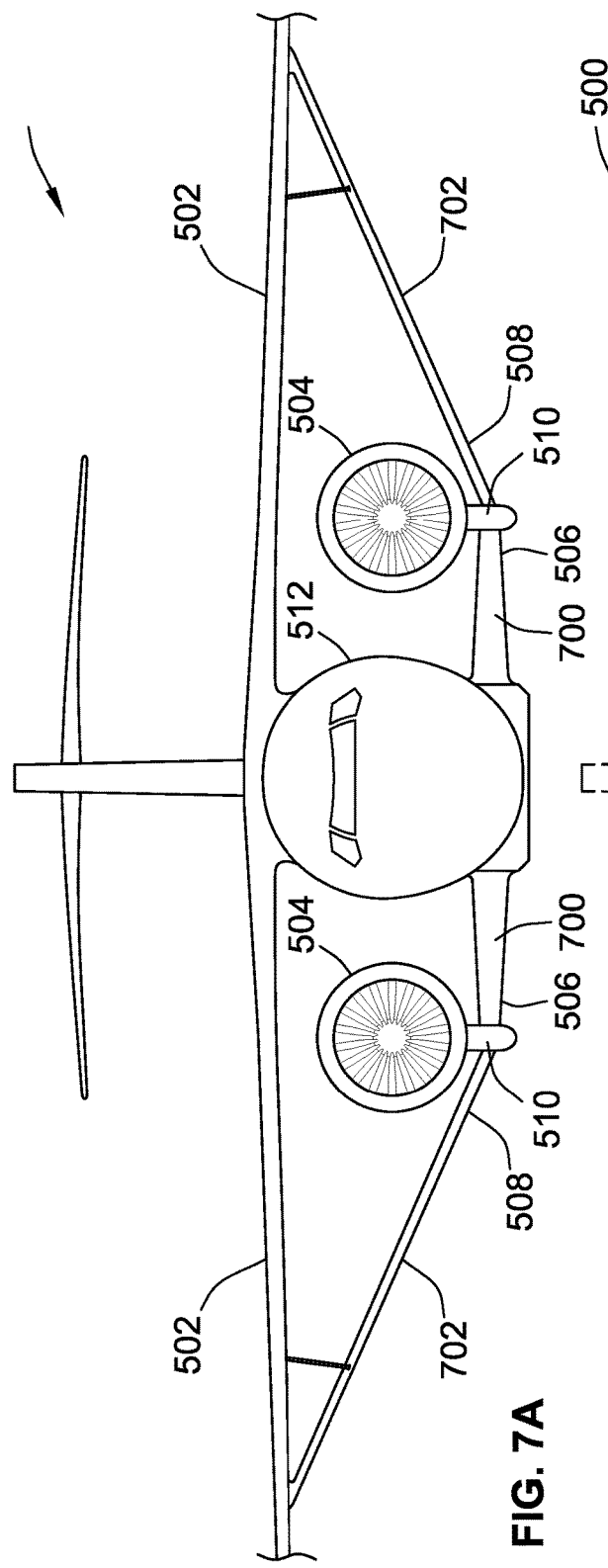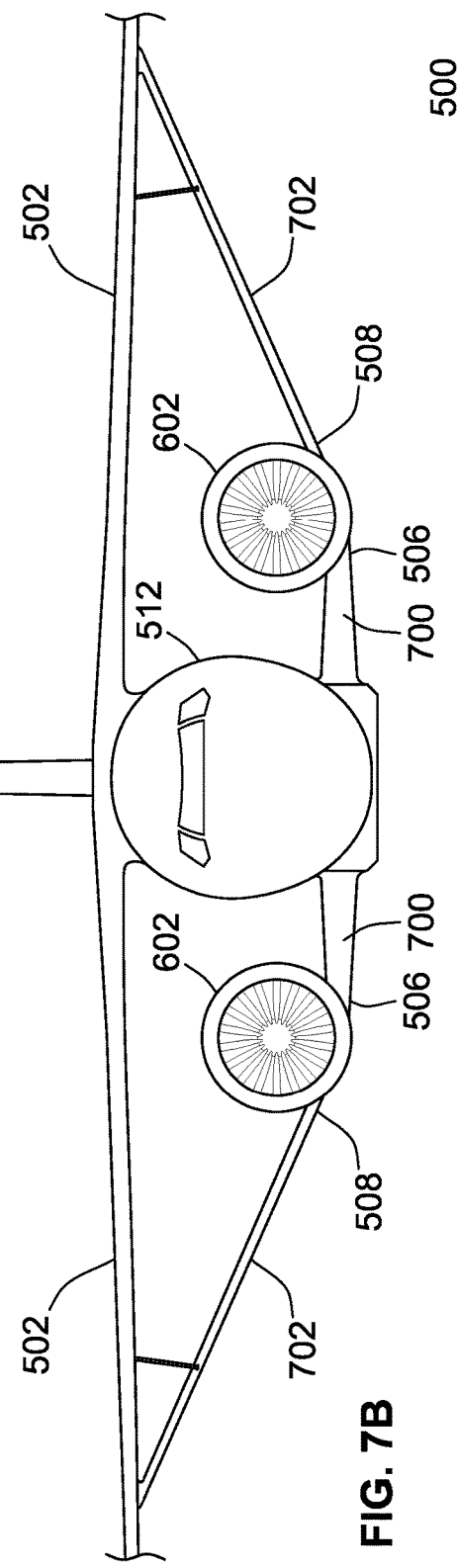
FIG. 7A
FIG. 7B

APPARATUS AND METHODS FOR TRANSONIC TRUSS-BRACED WING AIRCRAFT

FIELD

This disclosure relates generally to aircraft and, more particularly, to apparatus and methods for transonic truss-braced wing aircraft.

BACKGROUND

Transonic aircraft face challenges managing airflow and drag on the wings as air speeds approach the speed of sound. The wings of transonic aircraft are carefully designed to manage airflow, but many wing designs are limited by structural requirements, engine placements, and control surface requirements. Some transonic aircraft are designed with trusses that support the wings, thereby reducing the loads on the wing structures and the size of the structures required to support those loads. Many transonic truss-braced wing aircraft take advantage of these reduced structural requirements to lengthen wing spans and shorten chord lengths of the wings, thus improving wing performance at transonic speeds.

SUMMARY

An example aircraft disclosed herein includes a fuselage and a wing supported by a truss. The truss includes a pylon coupled to and extending from the fuselage and a strut attached to the wing. An engine is coupled to the pylon.

An example truss to support a wing of an aircraft disclosed herein includes a strut to be coupled to the wing, a pylon to be coupled to the strut and further to be coupled to the aircraft. The pylon is to receive an engine.

An example method of attaching an engine to an aircraft disclosed herein includes coupling a truss to a wing. The truss includes a strut coupled to the wing and a pylon. The example method further includes coupling the pylon to a fuselage of the aircraft and coupling an engine nacelle to the pylon of the truss.

BRIEF DESCRIPTION OF THE DRAWINGS

FIG. 6A illustrates a side view of the example aircraft of FIG. 5 with an example landing gear in an example deployed position.

FIG. 6B illustrates a side view of the example aircraft of FIG. 5 with the example landing gear in the example deployed position and an example engine coupled to a top side of the example pylon of the example truss without an engine strut.

FIGS. 7A-7B illustrate partial front views of the example aircraft of FIGS. 6A-6B.

Figure 1:
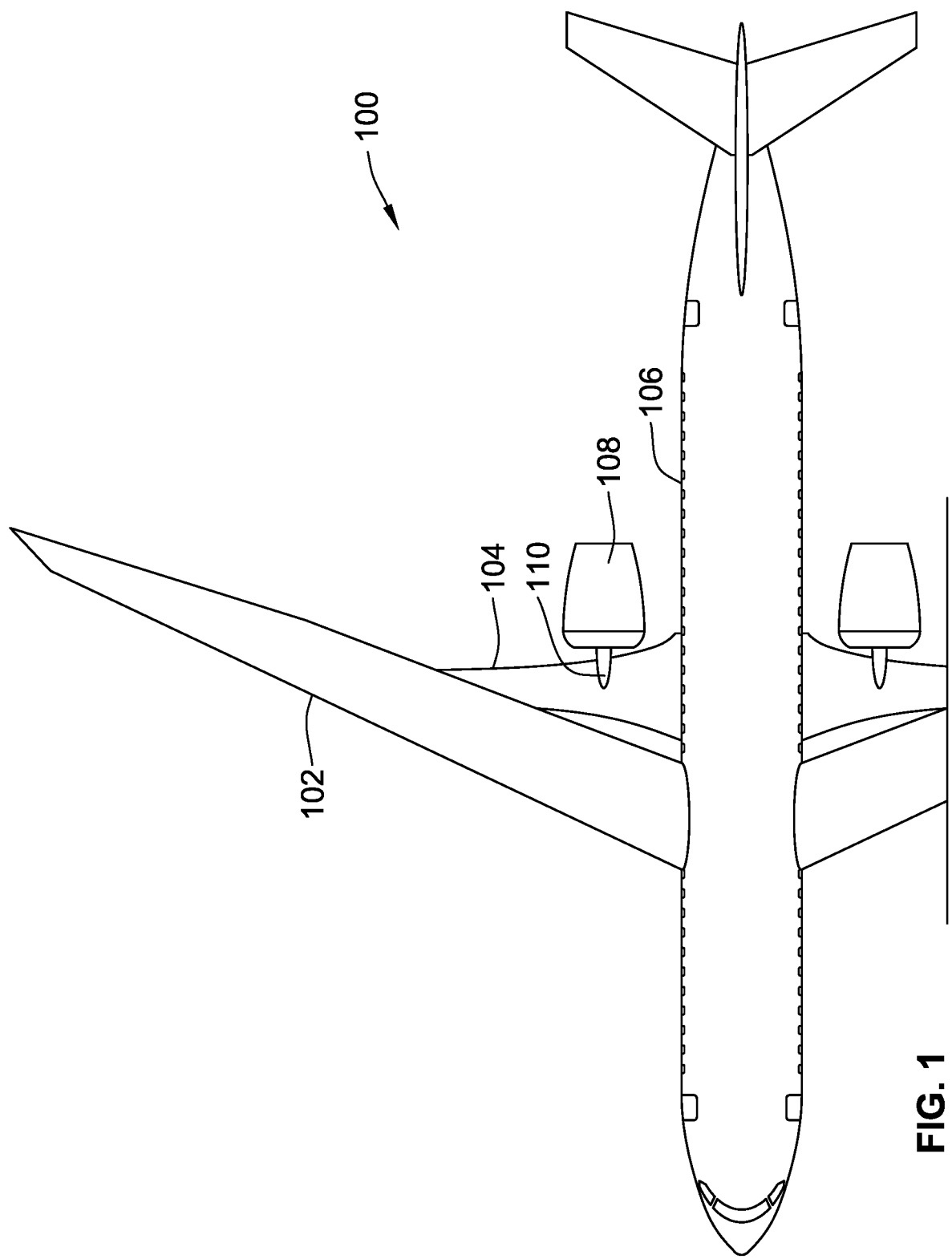
FIG. 1 illustrates a partial top view of an example aircraft with example aft swept wing and an example truss bracing the wing, in which example apparatus and methods disclosed herein can be implemented.

In general, the same reference numbers will be used throughout the drawing(s) and accompanying written description to refer to the same or like parts. The figures are not necessarily to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified in the below description.

DETAILED DESCRIPTION

Many transonic aircraft utilize cantilever wings (e.g., unsupported wings) as the main lift devices of the aircraft. Cantilever wings must be sized and designed withstand the working loads (e.g., weight of the wings, weight of the aircraft, lift forces, engine thrust, etc.) of the aircraft in flight, which results in a minimum cross-sectional area and related chord length. Thus, the aerodynamic performance of the wing (e.g., lift to drag ratio, aspect ratio, etc.) is limited by the self-supporting nature of the cantilever wing.

Truss-braced wings overcome the limitations of cantilevered wings by adding structure (e.g., truss bracing) to lower the working loads on the wings. The lower working loads require a smaller structure to support those loads, which allows the truss-braced wings to be designed with a smaller cross-sectional area and shorter chord length. In some instances, the reduction of working loads is significant enough to allow for an increased wingspan. A longer wingspan and shorter chord length result in increased performance of the truss-braced wings. However, the aspect ratio of the truss-braced wings is still constrained by the space required by the control surfaces, engines, and the components that support operation of the wings. For instance, aircraft engines are mounted from the wing (e.g., a bottom surface of the wing) via a pylon. A wing chord is sized (e.g., is of sufficient length and/or strength) to accommodate structures of the pylon for attaching the engine to the wing.

An example truss-braced wing aircraft disclosed herein has an engine located on a pylon of a truss (e.g., in contrast to a wing). This is advantageous over known truss-braced wing aircraft as the wing no longer needs to accommodate the engine, an engine pylon, fuel lines, nor other supporting structures/hardware for the engine and/or pylon. Additionally, wing chords of the example truss-braced wings can be made shorter as they no longer accommodate engine systems, which allows further aerodynamic optimization of the design of the wings. The smaller wing size and lower working loads further allow for simplification of the major fittings coupling the wing to the fuselage. Additionally, removing the engines from the wings allows some example truss-braced wings to improve high-lift performance with a more continuous spanload and/or uninterrupted high-lift system(s). In some example truss-braced wing aircraft, engines mounted on a pylon of a truss are positioned closer to a center of gravity of the aircraft, when compared to known aircraft, which advantageously places engine thrust closer to the center of gravity and reduces related trim drag on the aircraft and/or improves aircraft efficiency.

FIG. 1 illustrates a partial top view of an example aircraft 100 with an example aft swept wing 102 and an example truss 104 bracing the wing 102, in which example apparatus and methods can be implemented in accordance with the teachings of this disclosure. The wing 102 of the aircraft 100 is supported by the truss 104, which is coupled to the wing 102 and an example fuselage 106. The wing 102 and the truss 104 are shown with example geometries, but other example truss-braced wings can have different geometries, mounting positions, and/or mounting angles relative to the fuselage 106. The truss 104 of FIG. 1 provides a load path between the fuselage 106 and the wing 102. Thus, a loading that the wing 102 experiences (e.g., weight of the wing, weight of control surfaces, lift forces, drag forces, etc.) is shared between the wing 102 and the truss 104. Known cantilever wings on known aircraft must support the entirety of loads that the cantilever wings experience with their own structure. Larger loading on the wings (e.g., larger engines, more cargo, harsher flight conditions) require larger structures to support the loading. In the case of known cantilever wings, this increased structural size means larger chord lengths of the wings and a corresponding reduction in performance due to increased drag on the wing. The example truss-braced wing 102 of FIG. 1 experiences reduced loading that allows the wing 102 to have a smaller structure and chord length thereby improving performance when compared to known cantilever wings.

An example engine 108 is coupled to the truss 104 through an example engine strut 110. The engine strut 110 is coupled to the truss 104 and extends aft of the truss 104 to position the engine 108 aft of the truss 104. The engine 108 is supported by the truss 104, which relieves the engine loads (e.g., engine weights, thrust loads) on wing 102. In other words, the engine 108 of the illustrated example is not coupled to the wing 102. Instead, the engine 108 is coupled to (e.g., directly attached to and/or supported by) the truss 104 (e.g., a pylon 300 of FIG. 3A). The loading of the example truss-braced wing 102 of aircraft 100 is substantially reduced by moving the engine 108 to the truss 104, which allows further optimization of the wing 102. The chord length of the wing 102 can be further reduced and the span of the wing 102 can be increased as the wing 102 no longer needs to support the full loads of the engine 108. Additionally, the wing 102 is no longer constrained to carry the engine support systems (e.g., engine pylons, fuel lines, engine control systems), all of which would require space in the wing 102. The control surfaces (e.g., flaps, ailerons, etc.) of wing 102 also benefit from the engine 108 being supported by truss 104, as the control surfaces can operate without aerodynamic interference from the engine 108 or its supporting structures. This benefit can be particularly advantageous for high-lift performance as the wing 102 has a more continuous spanload (e.g., lift) and uninterrupted high-lift systems (e.g., flaps).

Figure 2:
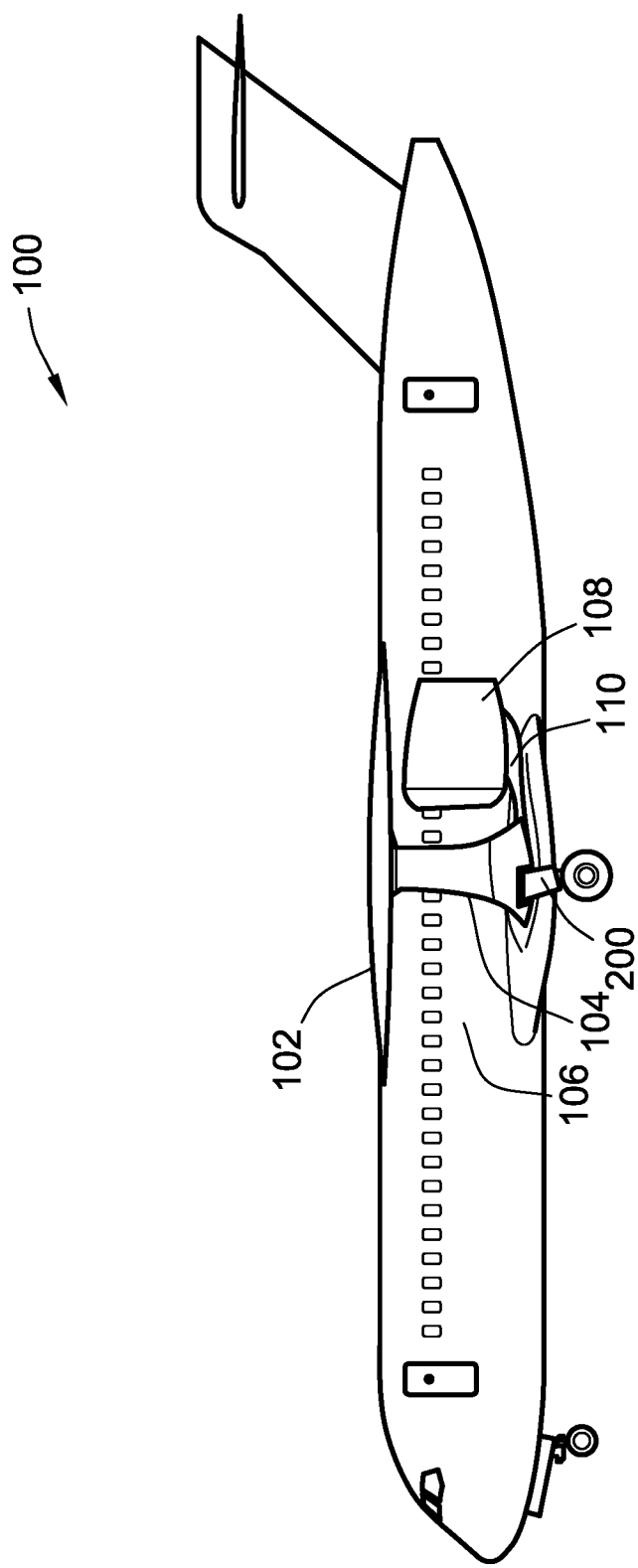
FIG. 2 illustrates a side view of the example aircraft of FIG. 1 with an example landing gear in an example deployed position.

FIG. 2 illustrates a side view of the example aircraft 100 of FIG. 1 with an example landing gear 200 in an example deployed position. In a stowed or retracted position, the landing gear 200 in this example is housed within the truss 104, and more specifically within a pylon of the truss (further detailed in FIGS. 3A and 3B). The truss 104 provides structure to support the landing gear 200 as well as housing the landing gear 200 when stowed, which frees space within the fuselage 106 to be used for other purposes (e.g., housing cargo).

By mounting to the example truss 104, the example engine 108 of FIG. 2 can be located (e.g., at different positions fore to aft) to better balance the weight of the aircraft 100. The aircraft 100 thus requires less trim from control surfaces (e.g., stabilizers, elevators) to maintain level flight, reducing related trim drag and/or further improving performance of the aircraft 100.

Figure 3A:
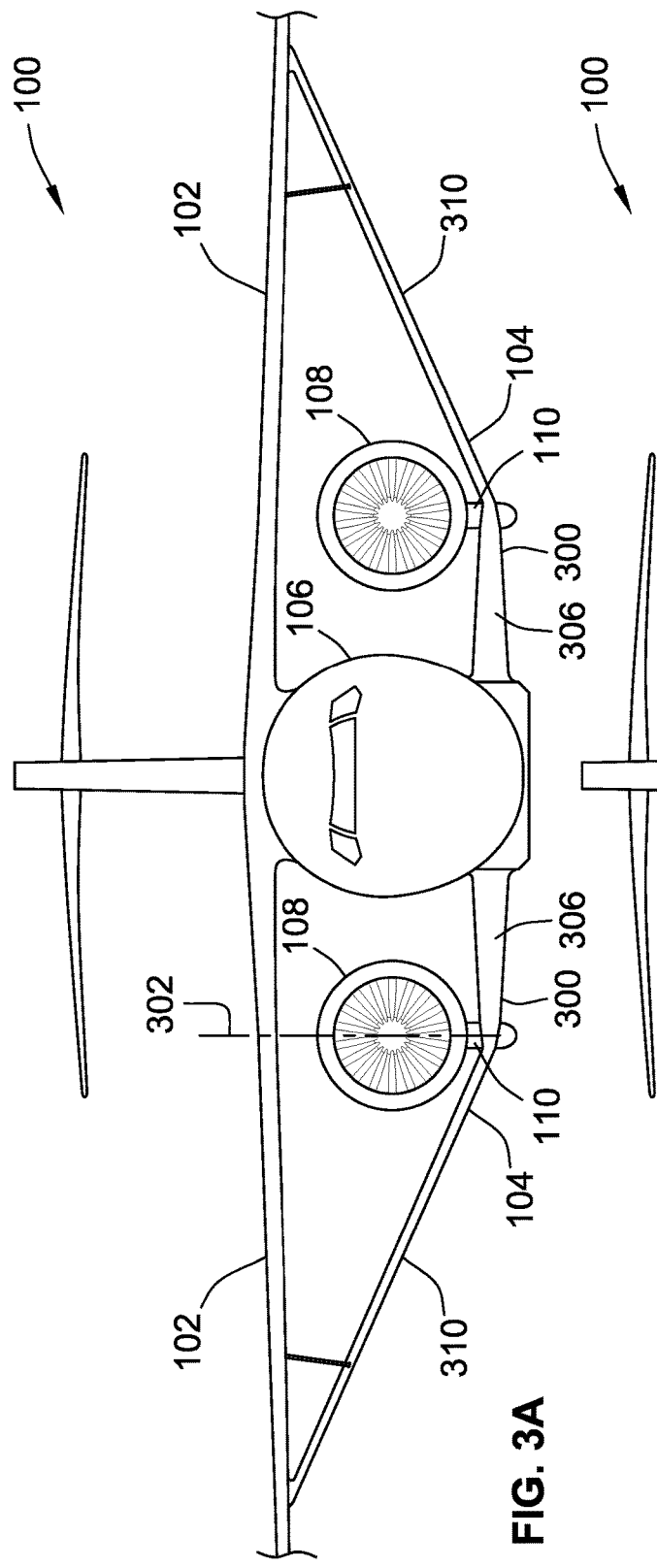
FIGS. 3A-3B illustrate partial front views of the example aircraft of FIG. 1, with example engines coupled to example pylons of the example trusses at example angles relative to the pylons.
Figure 3B:
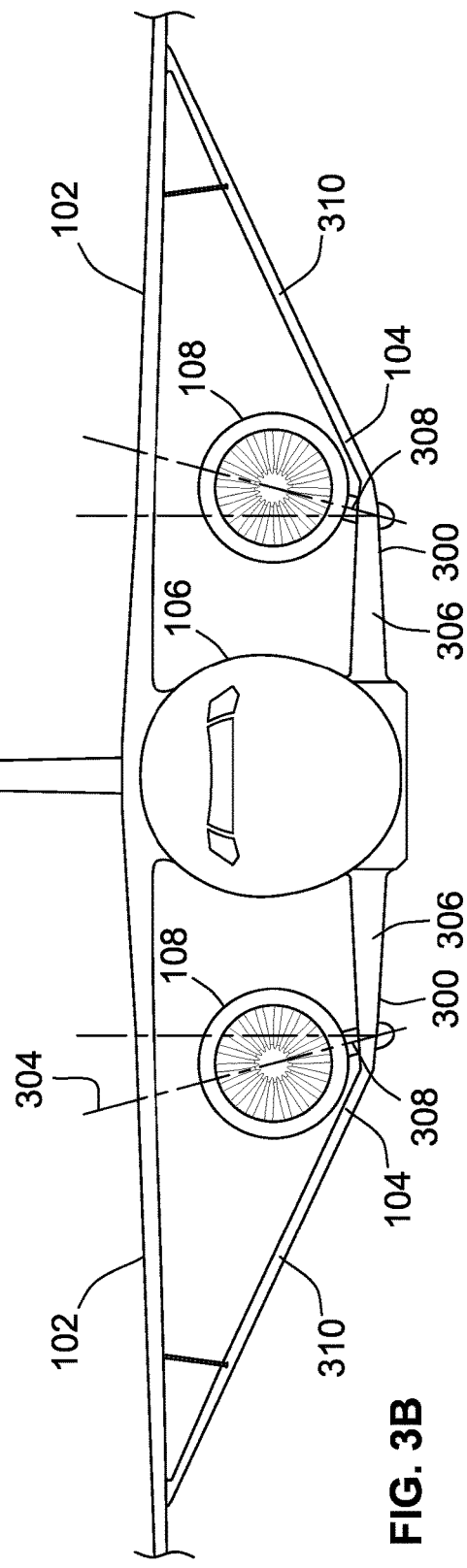

FIGS. 3A-3B illustrate partial front views of the example aircraft 100 of FIG. 1, with the example engines 108 coupled to example pylons 300 of the example trusses 104 at example angles 302 and 304 relative to the pylons 300. FIG. 3A illustrates the engines 108 coupled to the pylons 300 at a first example angle 302. FIG. 3B illustrates the engines 108 coupled to the pylons 300 at a second example angle 304 different than the first example angle 302.

The pylon 300 extends from the example fuselage 106 to support the engine 108 and the landing gear 200 (FIG. 2) (shown in an example stowed or retracted position housed within the pylons 300 in FIGS. 3A-3B). In other words, each pylon 300 houses a landing gear of the aircraft 100. In the illustrated example, the pylon 300 extends horizontally and/or perpendicular from the fuselage 106. The pylon 300 has an aerodynamic surface 306 (e.g., airfoil shape) that can act to reduce drag, provide secondary lift, condition an airflow into the engine 108, and/or any other advantageous aerodynamic function.

An example engine strut 110 couples (e.g., attaches) the pylon 300 and the engine 108. The example engine strut 110 of FIG. 3A is located on or adjacent to the outboard end of the pylon 300. In other words, the engine strut 110 of FIG. 3A is positioned within a boundary (e.g., a vertical plane at an outermost, outboard edge) of the pylon 300. In contrast, in FIG. 3B, the example pylon 300 extends past an example engine strut 308. In other words, the example engine strut 308 is positioned inboard of the outboard end (e.g., an outermost, outboard edge) of the pylon 300 (e.g., a boundary or vertical plane at an outermost, outboard edge of the pylon 300). Thus, the engine 108 of the illustrated example is coupled directly to the pylon 300 via the engine strut 308. In other words, the engine 108 is not coupled to (e.g., is not directly attached to) the wing 102. For example, the engine 108 is directly attached to the pylon 300 via the engine strut 110. In other examples, the engine strut (e.g., the engine strut 110, the engine strut 308) can be coupled anywhere along (e.g., a longitudinal length of) the pylon 300. The example engine strut 110 of FIG. 3A is coupled at the first example angle 302 (e.g., perpendicular to a centerline of the pylon 300). The example engine strut 308 of FIG. 3B is coupled at the second example angle 304 (e.g., approximately between 10-15 degrees from perpendicular to the centerline of the pylon 300). The second angle 304 of engine strut 308 positions the engine 108 further away from the fuselage 106 without needing to extend the length of the pylon 300. Adding distance between the engine 108 and the fuselage 106 helps reduce noise and/or vibration transfer from the engine 108 to the fuselage 106, which provides a more comfortable experience for passengers in the aircraft 100. Other example engine struts 110, 308 can be mounted at different angles (e.g., 5 degrees, 20 degrees, asymmetric angles, etc.).

Opposite the fuselage 106, the pylon 300 is coupled to an example strut 310 (e.g., a brace or support structure). In the illustrated example, the pylon 300 of the is positioned below the wing 102. For instance, the pylon 300 is spaced vertically from a lower surface of the wing 102 by a distance (e.g., greater than a diameter of the engine 108). The pylon 300 is coupled to (e.g., the lower surface of) the wing 102 via the strut 310. In other words, the outboard end of the pylon 300 is coupled to the strut 310. The strut 310 is further coupled to wing 102. Thus, a first end of the pylon 300 is coupled to the fuselage 106 and a second end of the pylon 300 opposite the first end is coupled to the truss 104 and/or the strut 310. A first end of the truss 104 and/or the strut 310 is coupled to the second end of the pylon 300 and a second end of the truss 104 and/or strut 310 opposite the first end is coupled to the wing 102. FIGS. 3A and 3B show the strut 310 coupled to the outboard end of pylon 300. In other examples, the strut 310 can be coupled anywhere along the pylon 300. For example, the first end of the strut 310 can be coupled to the pylon 300 at a location between the first end of the pylon 300 and the second end of the pylon 300 (e.g., inboard of the outermost or outboard edge of the pylon 300). The strut 310 and the pylon 300 of the illustrated example form the example truss 104. In other examples, the truss 104 can have additional supporting components (e.g., struts, pylons, jury struts). In some examples, the truss 104 can have alternative relative lengths and/or orientations of the strut 310 and the pylon 300. The size and/or orientation of truss 104 can change to meet the performance requirements of the example wing 102.

Figure 4:
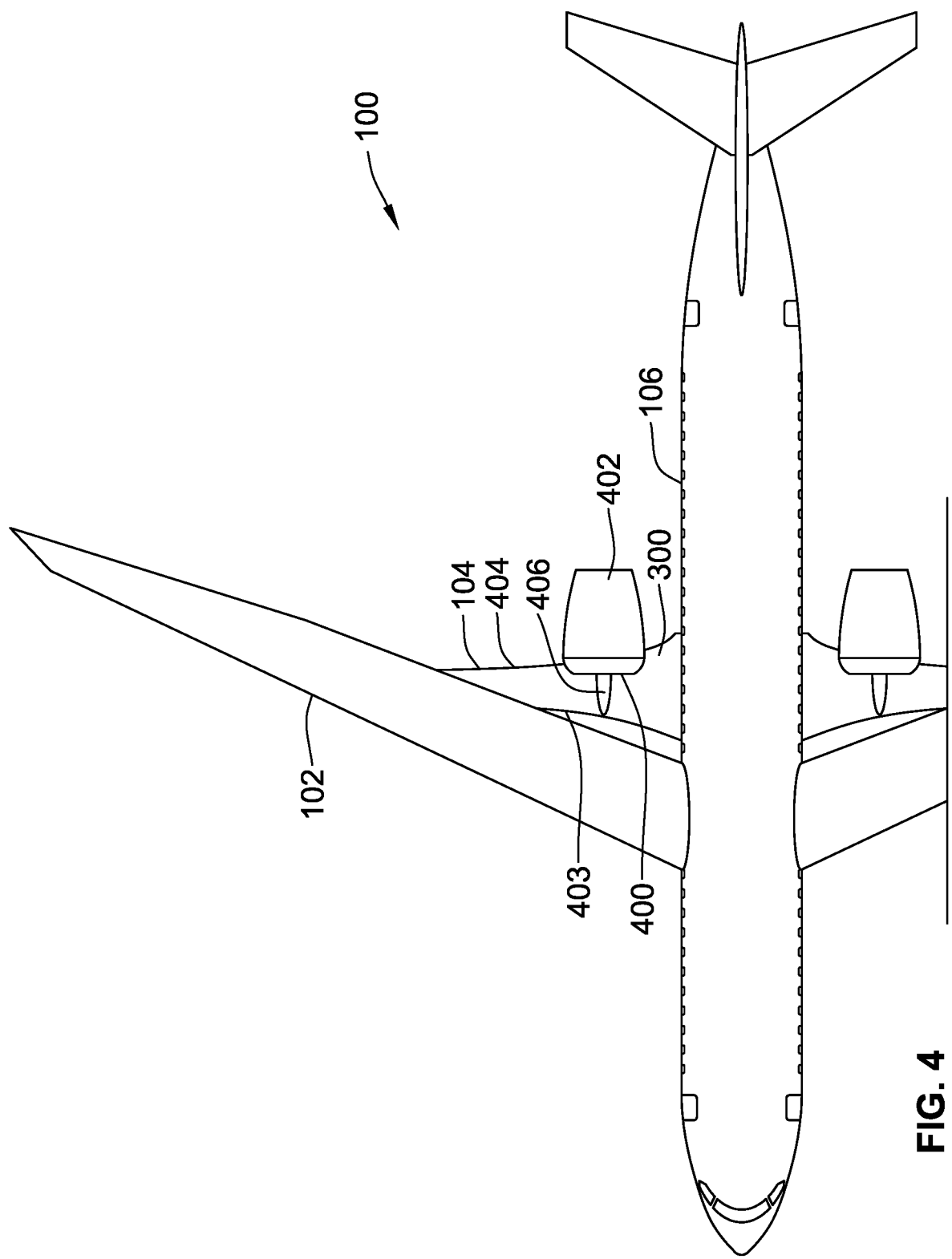
FIG. 4 illustrates a partial top view of the example aircraft of FIG. 1 with an example intake of an example engine positioned fore of an aft edge of the example pylon.

FIG. 4 illustrates a partial top view of the example aircraft 100 of FIG. 1 with an example intake 400 of an example engine 402 positioned fore of an aft edge 404 (e.g., a trailing edge) of the example pylon 300. The engine 402 is coupled to the pylon 300 with an example engine strut 406. The engine strut 406 has an example length and position on pylon 300, but the exact length and position can vary to suit the needs of an application. For example, the engine strut 406 couples to the structure of the pylon 300 and can be configured to extend between a fore edge 403 (e.g., a leading edge) of the pylon 300 and the aft edge 404 of the pylon 300. In some examples, the engine strut 406 extends between the fore edge 403 and an area adjacent a midpoint between of the pylon 300 between the fore edge 403 and the aft edge 404. The engine 402 is illustrated fore of the aft edge 404 at an example position to adjust the balance of the aircraft 100 and/or to adjust or improve an airflow into the intake 400 of the engine 402. Another example engine can have a different example position to better suit the center of mass of the aircraft 100, the thrust characteristics of the aircraft, and/or the aerodynamics of the wing 102 and the truss 104. Example positions of the engine 402 can include the intake 400 fore of the pylon 300 (e.g., fore of the leading edge or the fore edge 403), the intake 400 being at any intermediate position between fore of the pylon 300 and fore of the aft edge 404 of the pylon 300, and/or any other position(s).

Figure 5:
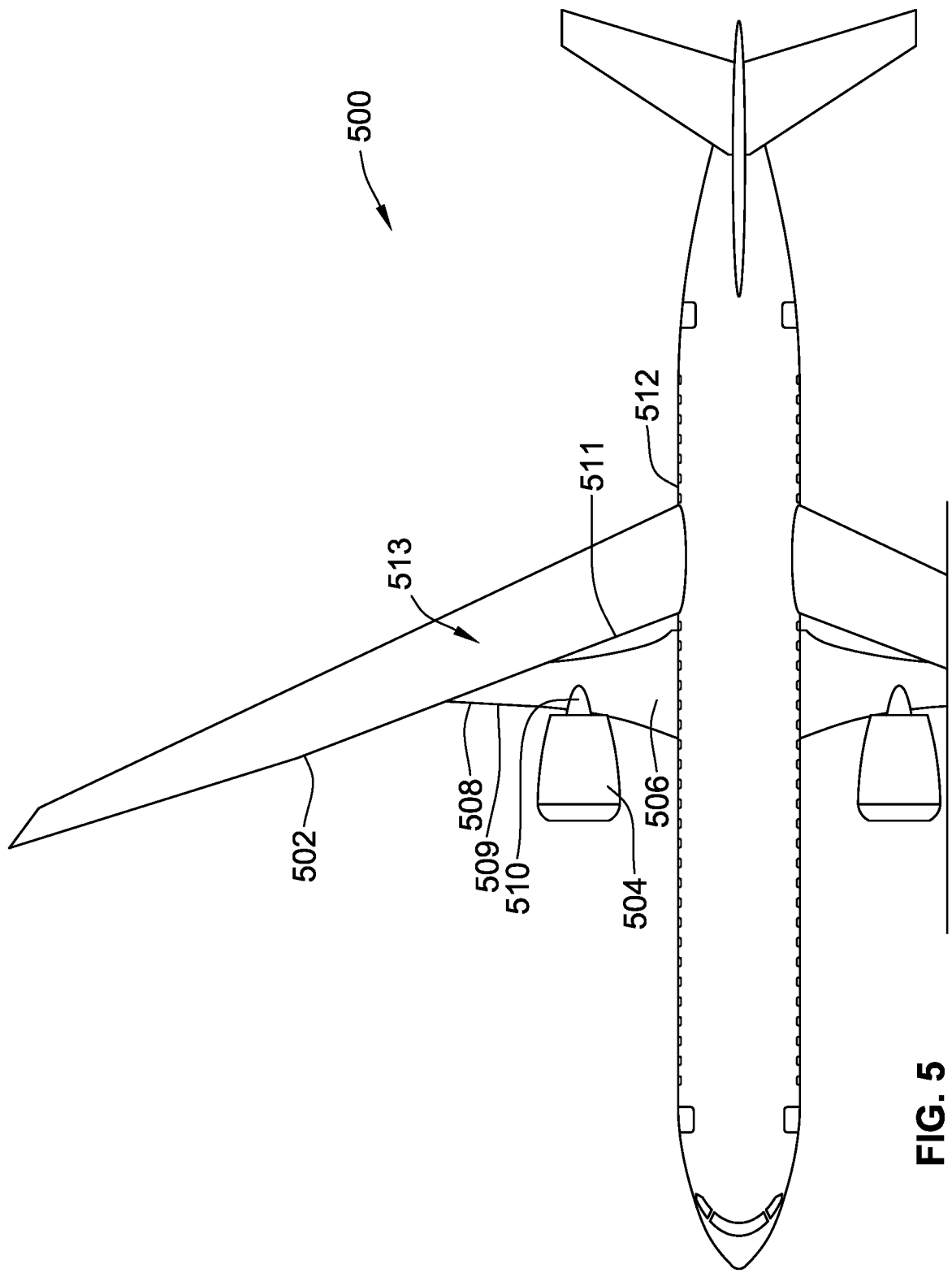
FIG. 5 illustrates a partial top view of another example aircraft with an example forward swept wing, including an example engine coupled to an example pylon of an example truss.

FIG. 5 illustrates a partial top view of another example aircraft 500 disclosed herein having an example forward swept wing 502. The example aircraft 500 of the illustrated example includes an example engine 504 coupled to an example pylon 506 of an example truss 508. An example engine strut 510 supports the engine 504 and couples the engine 504 and the pylon 506. The engine 504 is positioned fore of the truss 508. For example, at least a portion of the engine 504 is positioned fore of a fore edge 509 (e.g., a leading edge) of the pylon 506. In this configuration, the engine 504 benefits from an intake airflow that is undisturbed by any other structure (e.g., the wing 502, the truss 508, etc.) of the aircraft 500. In other words, an intake of the engine 504 is positioned fore of the fore edge 509 (e.g., the leading edge) of the truss 508 and/or a fore edge 511 (e.g., a leading edge) of a portion 513 of the wing 502 located adjacent a mounting location of the engine 504. Additionally, the forward swept wing 502 provides increased lift when compared to rearward swept example wings, which can be advantageous for some example aircraft. The wing 502 is coupled to the truss 508 and a fuselage 512 of the aircraft 500. The truss 508 is coupled to the fuselage 512 via the inboard side of the pylon 506. The aircraft 500 benefits from the truss-braced wing design of wing 502, which allows a smaller chord length and a larger span and the associated performance benefits as described herein relating to the example aircraft 100.

FIG. 6A illustrates a side view of the example aircraft 500 of FIG. 5 with an example landing gear 600 in an example deployed position. The landing gear 600 is housed in the pylon 506 in a stowed or retracted position, which allows space in the fuselage 512 to be used for other purposes. By mounting to the example truss 508, the example engine 504 can be located (e.g., positioned fore to aft) to better balance the weight of the aircraft 500. Aircraft 500 would thus require less trim from control surfaces (e.g., stabilizers, elevators) to maintain level flight, reducing related trim drag and further improving performance of the aircraft 500.

FIG. 6B illustrates a side view of the example aircraft 500 of FIG. 5 with an example landing gear 600 in a deployed position and an example engine 602 coupled to a top side of the example pylon 506 of the example truss 508 without an engine strut. The pylon 506 can have an aerodynamic surface and a flap 604 coupled to the trailing edge of the pylon 506. The engine 602, coupled in this way, provides increased lift at low speeds as exhaust from the engine 602 passes directly over the flap 604 of pylon 506. The example aircraft 500 of FIG. 6B is well suited for situations where a short takeoff is required, as the forward swept wing 502 and upper surface blown flap 604 increase lift at low speeds. The aircraft 500 also benefits from a reduced noise footprint as the noise of engine 602 is at least partially reflected upward by the upper surface of pylon 506.

FIGS. 7A-7B illustrate partial front views of the example aircraft 500 of FIGS. 6A-6B. The pylon 506 extends from the fuselage 512 to support the engine 504 and the landing gear 600 (not shown in FIGS. 7A-7B). The pylon 506 has an aerodynamic surface 700 (e.g., airfoil shape) that can act to reduce drag, provide secondary lift, condition an airflow into an example engine 504, and/or any other advantageous aerodynamic function. The engine strut 510 is coupled to the pylon 506 and the engine 504. The engine strut 510 of FIG. 7A is located on or adjacent the outboard end of the pylon 506 (e.g., an outermost end of the pylon 506), but in other examples the pylon 506 can extend past the engine strut 510. In other examples, the engine strut 510 can be coupled anywhere along the pylon 300 (e.g., the engine strut 510 can be positioned at different locations along a longitudinal length of the pylon 506 between a first end or inboard end which attaches to the fuselage 512 and a second end or outboard end opposite the first end that attaches to an example strut 702). The example engine strut 510 is coupled at an example angle (e.g., perpendicular to a centerline of pylon 506). However, in other examples, the engine strut 510 can be at other angles (e.g., approximately between 10-15 degrees from perpendicular to the centerline of pylon 506). In FIG. 7B, the engine 602 is mounted to the pylon 506 without the use of an engine strut. The engine 602 is mounted on or adjacent the outboard end of the pylon 506. In other examples, the pylon 506 can extend past the engine 602. In some examples the position of engine 602 can be anywhere along (e.g., a longitudinal length of) the pylon 506.

In FIGS. 7A-7B, the pylon 506 is coupled to an example strut 702 opposite the fuselage 512. The strut 702 is further coupled to wing 502. Thus, the strut 702 extends between the pylon 506 and the wing 502. FIGS. 7A-7B show the strut 702 coupled to the outboard end of pylon 506. In other examples, the strut 702 can be coupled anywhere along the pylon 506 (e.g., along a longitudinal length of the pylon 506). The strut 702 and the pylon 506 form the example truss 508. In other examples, the truss 508 can have additional supporting components (e.g., struts, pylons, jury struts) or alternative relative lengths and orientations of the strut 702 and the pylon 506. The exact size and/or orientation of the truss 508 can change to meet the performance requirements of the wing 502.

Figure 8:
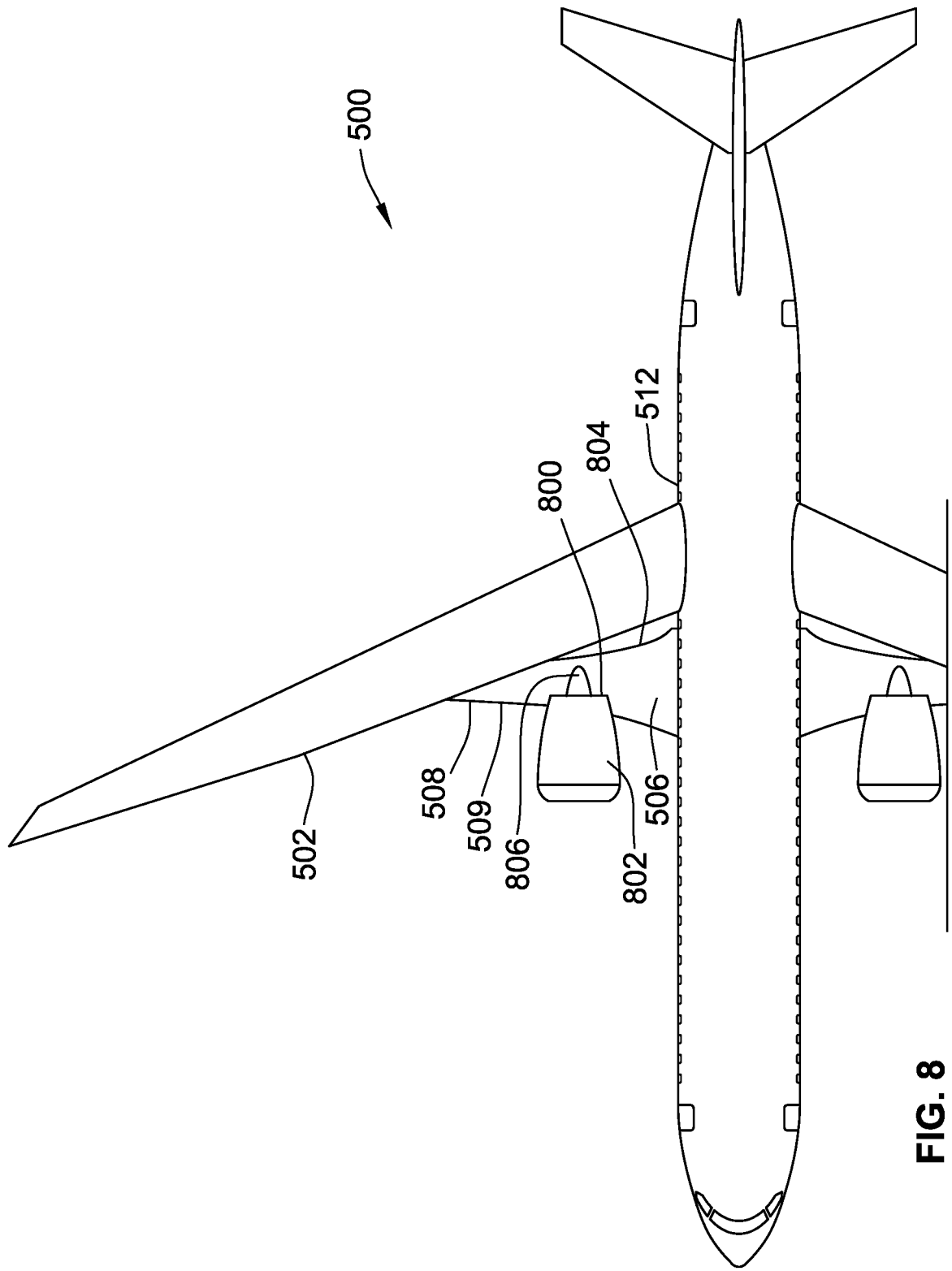
FIG. 8 illustrates a partial top view of the example aircraft of FIG. 5 with an example exhaust outlet of an example engine positioned aft of a fore edge of the example pylon.

FIG. 8 illustrates a partial top view of the example aircraft 500 of FIG. 5 with an example exhaust outlet 800 of an example engine 802 positioned aft of the fore edge 509 (e.g., the leading edge) of the example pylon 506. The engine 802 is coupled to the pylon 506 with an example engine strut 806. The engine strut 806 has an example length and position on the pylon 506, but the exact length and/or position can vary. At least a portion of the engine 802 overlaps or is positioned over the fore edge 509 of the pylon 506 at an example position. Thus, the engine 802 of the illustrated example straddles the fore edge 509 of the pylon 506. In some examples, the engine 802 can have different positions to adjust the balance of the aircraft 500 and/or an exhaust (e.g., an exhaust plume) of the exhaust outlet 800 of the engine 802 relative to a surface of the pylon 506 and/or the wing 502. Another example engine can have a different example position to better suit the center of mass of the aircraft 500, the thrust characteristics of the aircraft, and/or the aerodynamics of the wing 502 and/or the truss 508. Example positions of the engine 802 can include the exhaust outlet 800 located aft of the fore edge 509 of the pylon 506, any intermediate position such that the exhaust outlet 800 is positioned between the fore edge 509 of the pylon 506 and an aft edge 804 (e.g., a trialing edge) of the pylon 506, fore of the fore edge 509 of the pylon 506, aft of the pylon 506 (e.g., the aft edge 804), and/or any other position relative to the pylon 506 and/or the wing 502.

Figure 9A:
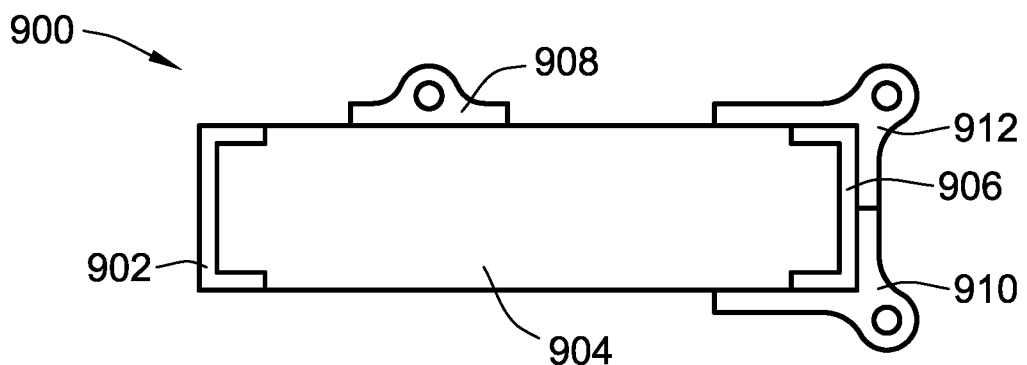
FIG. 9A Illustrates a cross section of example mounting hardware attached to an example pylon of an example truss of an example aircraft.

FIG. 9A is a cross section of example mounting hardware attached to an example pylon 900 of an example truss of an example aircraft. The pylon 900 includes an example forward spar 902, an example rib 904, and an example aft spar 906. Fixed to the pylon 900 are an example first brace fitting 908, an example first strut fitting 910, an example second strut fitting 912, and an example third strut fitting 914 (shown in FIG. 9B). In some examples, the pylon 900 can have an aerodynamic surface covering the above-noted structures. In some examples, the first, second and third strut fittings 910, 912, and 914 are covered in an aerodynamic surface (e.g., a fairing).

Figure 9B:
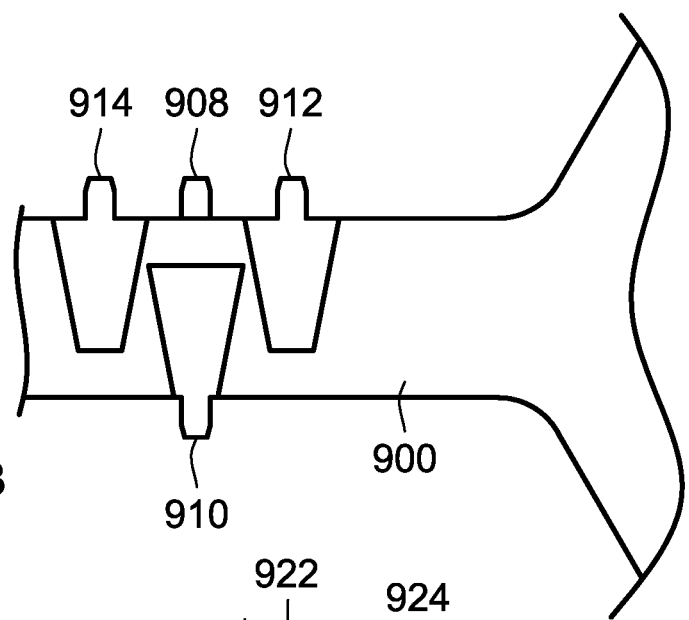
FIG. 9B is a front view of the example mounting hardware of FIG. 9A.

FIG. 9B is a front view of the example mounting hardware of FIG. 9A. The second strut fitting 912 and the third strut fitting 914 are positioned to receive mating fittings of an example engine strut (shown in FIG. 10). The first brace fitting 908 is positioned to receive a bracing link. The first strut fitting 910 is positioned to receive a lower link. The aforementioned fittings allow for a secure coupling of an engine to the pylon 900 (further detailed in FIG. 10).

Figure 9C:
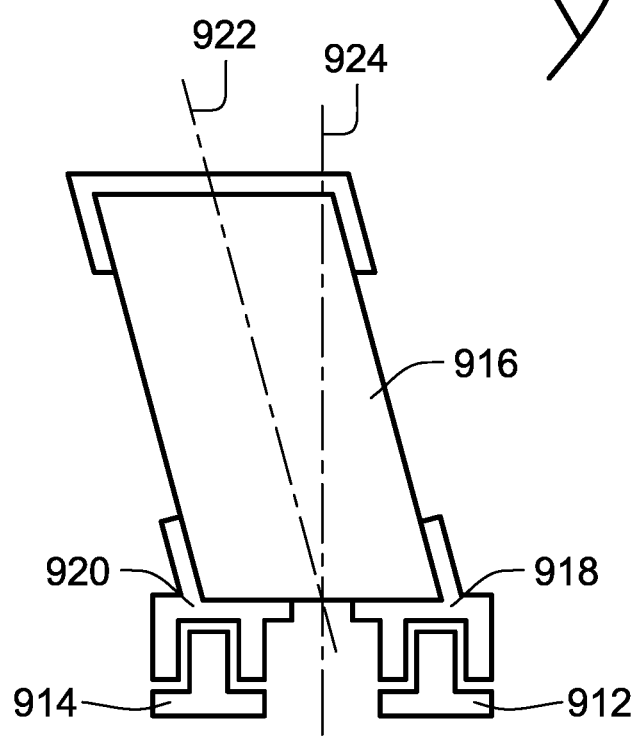
FIG. 9C illustrates an example angled engine strut to attach to example mounting hardware of an example pylon.

FIG. 9C illustrates an example angled engine strut 916 to attach to example mounting hardware of an example pylon. The example mounting hardware includes the second strut fitting 912 and the third strut fitting 914, which couple to an example fourth strut fitting 918 and an example fifth strut fitting 920, respectively. The angled engine strut 916 allows an example engine to be mounted at an angle 922 (e.g., approximately between 10-15 degrees from a line 924 perpendicular to a pylon), as illustrated in FIG. 3B.

Figure 10:
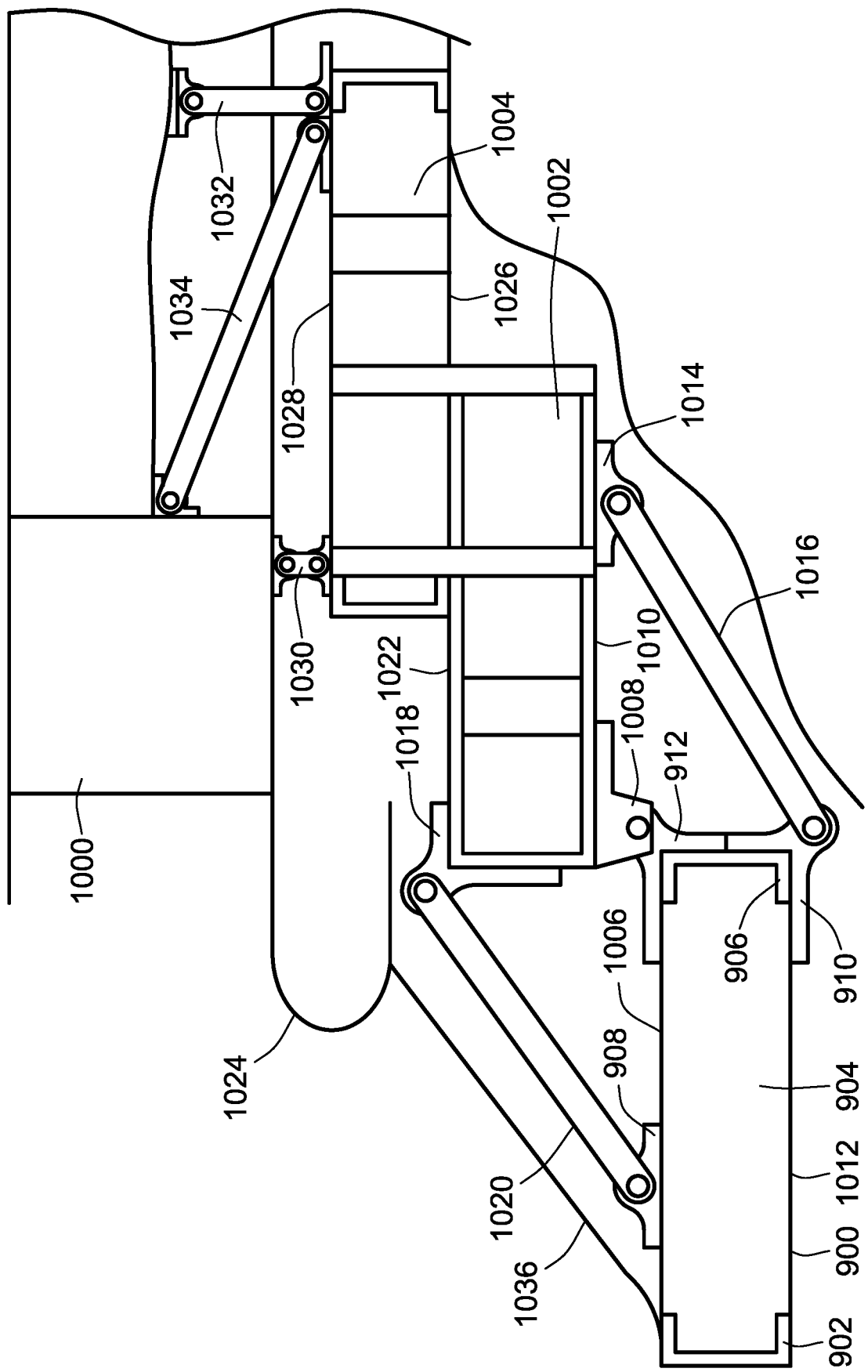
FIG. 10 illustrates an example engine nacelle coupled to the example pylon of FIGS. 9A-9B with example engine struts.

FIG. 10 illustrates an example engine nacelle 1000 coupled to the example pylon 900 of FIGS. 9A-9B with example engine struts (e.g., a first engine strut 1002, a second engine strut 1004). The first engine strut 1002 is coupled to a top side 1006 of the pylon 900. The second strut fitting 912 (fixed on an aft edge of the top side 1006 of pylon 900) couples to an example fourth strut fitting 1008 (fixed on a fore edge of a bottom side 1010 of the first engine strut 1002). In some examples, the pylon 900 has a third strut fitting (e.g., the third strut fitting 914) (fixed on the aft edge of the top side 1006 of pylon 900) coupled to a fifth strut fitting (e.g., the fifth strut fitting 920) (fixed on the forward edge of the bottom side 1010 of the first engine strut 1002). The first strut fitting 910 of FIG. 10 is coupled to an aft edge of a bottom side 1012 of the pylon 900. The first strut fitting 910 is coupled to a sixth strut fitting 1014 through a lower link 1016. The sixth strut fitting 1014 is located aft of the fourth strut fitting 1008 on the bottom side 1010 of the first engine strut 1002. The first brace fitting 908 is located fore of the second strut fitting 912 on the top side 1006 of the pylon 900. The first brace fitting 908 is coupled to a second brace fitting 1018 through a diagonal brace 1020. The second brace fitting 1018 of the illustrated example is located on a forward edge of a top side 1022 of the first engine strut 1002. Thus, the first engine strut 1002 is securely coupled to the top side 1006 of the pylon 900 to hold the weight of the engine nacelle 1000 and transfer an engine thrust to the aircraft 100.

The engine nacelle 1000 of FIG. 10 is positioned above an aft edge of the pylon 900. In other examples, the engine nacelle 1000 is positioned above the fore edge of the pylon 900, with the mounting hardware switched from aft to fore. The orientation of the engine nacelle 1000 and the distance between the pylon 900 and the engine nacelle 1000 can vary to meet the needs of the aircraft 100 (e.g., weight distribution, aerodynamics, thrust characteristics, etc.).

In some examples, the engine nacelle 1000 can be directly coupled to the first engine strut 1002. In other examples, an example cowling 1024 of the engine nacelle 1000 may contact mounting hardware (e.g., second brace fitting 1018, diagonal brace 1020, etc.) when mounted directly to the first engine strut 1002. In such a case, the example engine nacelle 1000 of FIG. 10 is coupled to the first engine strut 1002 through a second engine strut 1004, thereby allowing the cowling 1024 to remain spaced from mounting hardware. The second engine strut 1004 is an example height from a bottom side 1026 to a top side 1028, but other example second engine struts 1004 can have different heights to raise or lower the engine nacelle 1000 relative to the pylon 900.

The example engine nacelle of FIG. 10 is coupled to the top side 1028 of the second engine strut 1004. An example forward mount 1030 couples to a fore section of the top side 1028 of the second engine strut 1004 and to a fore section of the engine nacelle 1000. An example aft mount 1032 couples to an aft section of the top side 1028 of the second engine strut 1004 and to an aft section of the engine nacelle 1000. An example thrust link 1034 is coupled to an aft section of the top side 1028 of the second engine strut 1004 and to a fore section of the engine nacelle 1000. The forward mount 1030 and the aft mount 1032 support the engine nacelle 1000 and couple it to the second engine strut 1004. The thrust link 1034 supports and transfers thrust forces generated by the engine nacelle 1000 to the second engine strut 1004. The forward mount 1030, the aft mount 1032, and the thrust link 1034 are shown in example positions, but in other examples their exact locations relative to the engine nacelle 1000 and second engine strut 1004 can vary. The first and second engine struts 1002 and 1004 are, in some examples, covered by an example fairing 1036. The fairing 1036 surrounds the first and second engine struts 1002 and 1004 creating an aerodynamic surface that improves performance (e.g., reduces drag). The example pylon 900, engine struts and/or nacelles of FIGS. 9-10 can be employed to mount the different example engines 108, 402, 504, 602, 802 to the example pylons 300, 506, and/or the truss 104, 508 disclosed herein.

Figure 11:
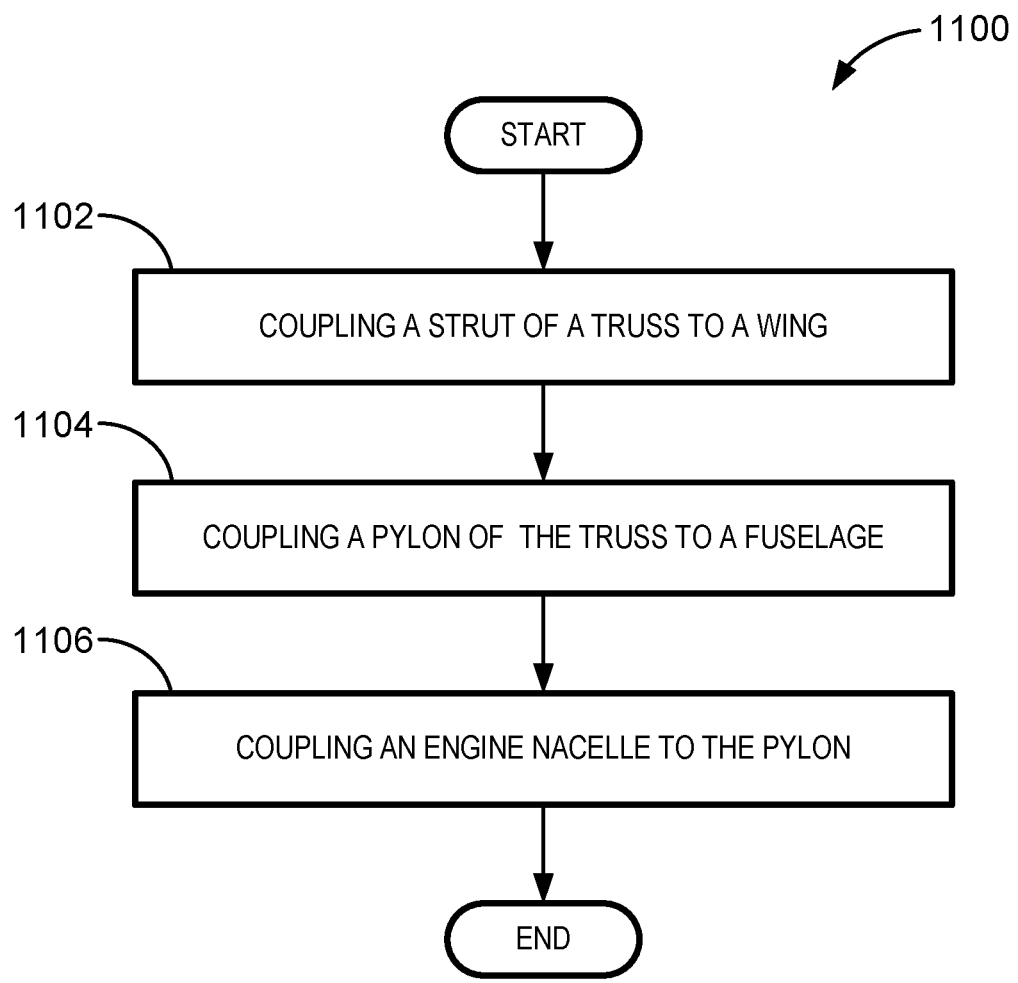
FIG. 11 is a flowchart representative of an example method for attaching an example engine nacelle to an example aircraft.

FIG. 11 is a flowchart representative of an example method 1100 for attaching an example engine nacelle to an example aircraft. The method 1100 begins with coupling a strut (e.g., strut 310) of a truss (e.g., truss 104) to a wing (e.g., wing 102) (block 1102). The method 1100 continues with coupling a pylon (e.g., pylon 300) of the truss (e.g., truss 104) to a fuselage (e.g., fuselage 106) (block 1104). The truss, including the strut and pylon, rigidly supports the wing and provides additional structure for the aircraft. The method 1100 ends with coupling an engine nacelle (e.g., engine nacelle 1000) to the pylon (e.g., pylon 300) (block 1106). In some examples, the engine nacelle is coupled to a top side of the pylon. In some examples, the engine nacelle includes an aerodynamic surface (e.g., fairing 1036) positioned between the engine nacelle and the strut. In some examples, a first engine strut (e.g., first engine strut 1002) is coupled to the top side of the pylon and the engine nacelle. The first engine strut positions the engine nacelle away from the pylon. In some examples, a second engine strut is coupled between the first engine strut and the engine nacelle. In other examples any number of engine struts are coupled between the pylon and the engine nacelle, allowing the engine nacelle to be positioned at different locations relative to the pylon.

The foregoing examples provide different examples of mounting an engine to a truss of a truss-braced wing aircraft. Although each example wings, pylons, trusses and/or aircraft disclosed above have certain features, it should be understood that it is not necessary for a particular feature of one example to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features.

The following paragraphs provide various examples of apparatus and methods for transonic truss-braced wing aircraft disclosed herein:

Example 1 is an aircraft including a fuselage and a wing supported by a truss. The truss includes a pylon coupled to and extending from the fuselage and a strut attached to the wing. An engine is coupled to the pylon.

Example 2 includes the aircraft of example 1, where the wing is an aft swept wing.

Example 3 includes the aircraft of example 2, where an intake of the engine is positioned aft of the wing.

Example 4 includes the aircraft of example 2, where an intake of the engine is positioned aft of the pylon.

Example 5 includes the aircraft of example 1, where the wing is a forward swept wing.

Example 6 includes the aircraft of example 5, where an exhaust outlet of the engine is positioned fore of the wing.

Example 7 includes the aircraft of example 5, where an exhaust outlet of the engine is positioned fore of the pylon.

Example 8 includes the aircraft of example 6, where the engine is coupled directly to the pylon.

Example 9 is a truss to support a wing of an aircraft, including a strut coupled to the wing and a pylon coupled to the strut. The pylon is further coupled to the aircraft. The pylon receives an engine.

Example 10 includes the truss of example 9, where the engine is coupled to the pylon through an engine strut.

Example 11 includes the truss of example 10, where the engine strut is mounted at an angle of 10-15 degrees from a line perpendicular to the pylon.

Example 12 includes the truss of example 10, where the engine strut is positioned fore of the pylon.

Exampled 13 includes the truss of example 10, where the engine strut is positioned aft of the pylon.

Example 14 includes the truss of example 9, wherein the pylon has an airfoil shape.

Example 15 includes the truss of example 9, further including a landing gear housed within the pylon.

Example 16 is a method of attaching an engine to an aircraft including coupling a truss to a wing. The truss has a strut coupled to the wing and a pylon. The method of example 16 also includes coupling the pylon to a fuselage of the aircraft and coupling an engine nacelle to the pylon of the truss.

Example 17 includes the method of example 16, where coupling the engine nacelle to the pylon includes coupling the engine nacelle to a top side of the pylon.

Example 18 includes the method of example 17, where the engine nacelle includes an aerodynamic surface positioned between the engine nacelle and the pylon.

Example 19 includes the method of example 17, where coupling the engine nacelle to the pylon includes coupling a first engine strut between the top side of the pylon and the engine nacelle.

Example 20 includes the method of example 19, where coupling the engine nacelle to the pylon includes coupling a second engine strut between the first engine strut and the engine nacelle.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. An aircraft comprising:
   a fuselage;
   a wing supported by a truss, the truss including:
      a pylon coupled to and extending from the fuselage; and
      a wing-to-pylon strut attached to the wing and the pylon;
   an engine strut coupled to the pylon, the engine strut extending from the pylon at an angle relative a vertical axis of the fuselage; and
   an engine coupled to the pylon via the engine strut.

2. An aircraft as recited in claim 1, wherein the wing is an aft swept wing.

3. An aircraft as recited in claim 2, wherein an intake of the engine is positioned aft of at least a portion of the wing.

4. An aircraft as recited in claim 2, wherein an intake of the engine is positioned aft of the pylon.

5. An aircraft as recited in claim 1, wherein the wing is a forward swept wing.

6. An aircraft as recited in claim 5, wherein an exhaust outlet of the engine is positioned fore of the wing.

7. An aircraft as recited in claim 5, wherein an exhaust outlet of the engine is positioned fore of the pylon.

8. An aircraft as recited in claim 1, wherein the angle is 10-15 degrees.

9. An aircraft as recited in claim 1, wherein the angle is away from the fuselage.

10. A method of attaching an engine to an aircraft comprising:
    coupling a truss to a wing, the truss having a pylon-to-wing strut coupled to the wing and a pylon;
    coupling the pylon to a fuselage of the aircraft; and
    coupling an engine nacelle to the pylon of the truss via an engine strut, the engine strut extending from the pylon at an angle relative a vertical axis of the fuselage.

11. A method as recited in claim 10, wherein coupling the engine nacelle to the pylon includes coupling the engine nacelle to a top side of the pylon.

12. A method as recited in claim 11, wherein the engine nacelle comprises an aerodynamic surface positioned between the engine nacelle and the pylon.

13. A method as recited in claim 11, wherein coupling the engine nacelle to the pylon includes coupling a first engine strut between the top side of the pylon and the engine nacelle.

14. An aircraft comprising:
    a fuselage;
    a wing having a first end coupled to the fuselage at a first location and a second end extending from the fuselage;
    a truss to support the wing, the truss including a pylon, the pylon having a third end coupled to the fuselage at a second location and a fourth end extending from the fuselage, the second location different from the first location; and
    an engine coupled to the truss via an engine strut coupled to the pylon, the engine strut coupled to and extending from the pylon at an angle relative a vertical axis of the fuselage, wherein an intake of the engine is positioned aft of at least a portion of a trailing edge of the pylon.

15. An aircraft as recited in claim 14, wherein the engine is coupled to the pylon near the fourth end.

16. An aircraft as recited in claim 15, wherein a center of the engine is further from the fuselage than a center of the pylon.

17. An aircraft as recited in claim 15, wherein the pylon extends aft of the truss.

18. An aircraft as recited in claim 14, further including a landing gear housed within the truss.

19. An aircraft as recited in claim 14, wherein the pylon has an airfoil shape.

20. An aircraft as recited in claim 14, further including a strut extending between the wing and the pylon, the strut having a fifth end attached to the wing and a sixth end opposite the fifth end attached to the pylon.

21. An aircraft as recited in claim 20, wherein the sixth end of the strut is coupled to the fourth end of the pylon and the fifth end of the strut is coupled to a lower surface of the wing at a location between the first end and the second end.

* * * * *